US010044565B1

United States Patent
Robinson et al.

(10) Patent No.: US 10,044,565 B1
(45) Date of Patent: Aug. 7, 2018

(54) WIRELESS NETWORK INTERFACE MANAGEMENT ON A MULTI-RADIO EMBEDDED COMPUTING DEVICE

(71) Applicant: Verizon Patent and Licensing Inc., Arlington, VA (US)

(72) Inventors: Quentin N. Robinson, Willingboro, NJ (US); Carl Wang, Syosset, NY (US); Shamik Basu, Lake Hiawatha, NJ (US); Theodore Stecko, Natick, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/407,247

(22) Filed: Jan. 16, 2017

(51) Int. Cl.
| | |
|---|---|
| *H04L 12/24* | (2006.01) |
| *H04W 4/00* | (2018.01) |
| *H04W 76/04* | (2009.01) |
| *H04W 24/02* | (2009.01) |
| *H04W 76/27* | (2018.01) |
| *H04W 4/80* | (2018.01) |
| *H04W 84/04* | (2009.01) |
| *H04W 84/12* | (2009.01) |

(52) U.S. Cl.
CPC ......... *H04L 41/0823* (2013.01); *H04W 4/008* (2013.01); *H04W 4/80* (2018.02); *H04W 24/02* (2013.01); *H04W 76/046* (2013.01); *H04W 76/27* (2018.02); *H04W 84/042* (2013.01); *H04W 84/12* (2013.01)

(58) Field of Classification Search
CPC ... H04W 88/02; H04W 4/00; H04W 52/0254; H04W 52/0274; H04W 88/00; H04W 16/14; H04W 24/02; H04W 84/12; H04W 88/06; H04W 24/04; H04W 40/04; H04W 40/12; H04W 40/246; H04W 48/18; H04W 72/005; H04W 72/02; H04W 76/046; H04W 4/008; H04W 84/042; H04L 41/0823
See application file for complete search history.

(56) References Cited

U.S. PATENT DOCUMENTS

| | | | |
|---|---|---|---|
| 6,526,034 B1* | 2/2003 | Gorsuch | H04W 48/18 370/333 |
| 2004/0162106 A1* | 8/2004 | Monroe | H04W 88/06 455/552.1 |
| 2013/0095847 A1* | 4/2013 | Powell | H04W 64/00 455/456.1 |
| 2016/0344572 A1* | 11/2016 | Brust | H04L 12/66 |

* cited by examiner

*Primary Examiner* — Daniel Lai

(57) ABSTRACT

Exemplary systems, methods, and apparatuses may direct an application processor of an embedded computing device to: detect an operational mode selection command received from an application being executed by the application processor, the operational mode selection command selecting, from a plurality of operational modes, an operational mode of the application; determine connection statuses of a plurality of wireless network interfaces of the embedded computing device; determine, in accordance with a wireless network configuration optimization heuristic, and based on the detected operational mode selection command and the determined connection statuses of the plurality of wireless network interfaces, a state configuration for the plurality of wireless network interfaces; and direct the plurality of wireless network interfaces to operate in accordance with the state configuration.

20 Claims, 6 Drawing Sheets

| Modes | Connection Statuses | State Configuraions | | | |
|---|---|---|---|---|---|
| | | BT 202 | Wi-Fi 204 | Cell 206 | |
| Cell Only Mode | BT 202: Network not available<br>Wi-Fi 204: Network not available<br>Cell 206: Network available | OFF | OFF | ON | 312-1 |
| | BT 202: Network not available<br>Wi-Fi 204: Network not available<br>Cell 206: Network not available | OFF | OFF | OFF | 312-2 |
| Data Mode | BT 202: Connected | ON | SCAN | SCAN | 314-1 |
| | Wi-Fi 204: Connected | OFF | ON | SCAN | 314-2 |
| | BT 202: Network not available<br>Wi-Fi 204: Network not available<br>Cell 206: Network available | OFF | SCAN | ON | 314-3 |
| Standard Mode | BT 202: Connected | ON | OFF | SLEEP | 316-1 |
| | BT 202: Connected<br>Wi-Fi 204: Network available | OFF | ON | SLEEP | 316-2 |
| | Wi-Fi 204: Connected | OFF | ON | SLEEP | 316-3 |
| | BT 202: Network not available<br>Wi-Fi 204: Network not available<br>Cell 206: Network available | OFF | OFF | STANDBY | 316-4 |
| | BT 202: Network not available<br>Wi-Fi 204: Network not available<br>Cell 206: Network not available | OFF | OFF | OFF | 316-5 |
| Deep Sleep Mode | BT 202: Connected | SLEEP | OFF | OFF | 318-1 |
| | Wi-Fi 204: Connected | OFF | SLEEP | OFF | 318-2 |
| | BT 202: Network not available<br>Wi-Fi 204: Network not available<br>Cell 206: Network available | OFF | OFF | OFF | 318-3 |
| | BT 202: Network not available<br>Wi-Fi 204: Network not available<br>Cell 206: Network not available | OFF | OFF | OFF | 318-4 |

Fig. 3

WIRELESS NETWORK INTERFACE MANAGEMENT ON A MULTI-RADIO EMBEDDED COMPUTING DEVICE

BACKGROUND INFORMATION

Certain embedded computing devices include a plurality of radio access technologies. For example, a smart watch device, an Internet-of-Things ("IoT") device, or other embedded computing device may be equipped with a Bluetooth radio, a Wi-Fi radio, and a cellular radio that support wireless communications by way of Bluetooth, Wi-Fi, and cellular communication signals, respectively.

Such an embedded computing device may include a unique configuration of radio access technologies and/or a real-time operating system ("RTOS") platform. Consequently, for an application executing on an embedded computing device to manage the available radio access technologies in a way that optimizes connectivity and/or resource usage (e.g., based on various network conditions and/or device operations), the application may need to implement a unique radio access technology management scheme for each different embedded computing device, radio access technology configuration, and/or RTOS platform on which the application may be executed. This may increase the complexity of the application, waste computing and/or wireless network resources, and/or limit the number, type, configuration, etc. of embedded computing devices to which the application may be deployed.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an exemplary predefined mapping of a plurality of operational modes and wireless network interface connection statuses to operation states of a plurality of wireless network interfaces according to principles described herein.

DETAILED DESCRIPTION OF PREFERRED EMBODIMENTS

Figure 1:
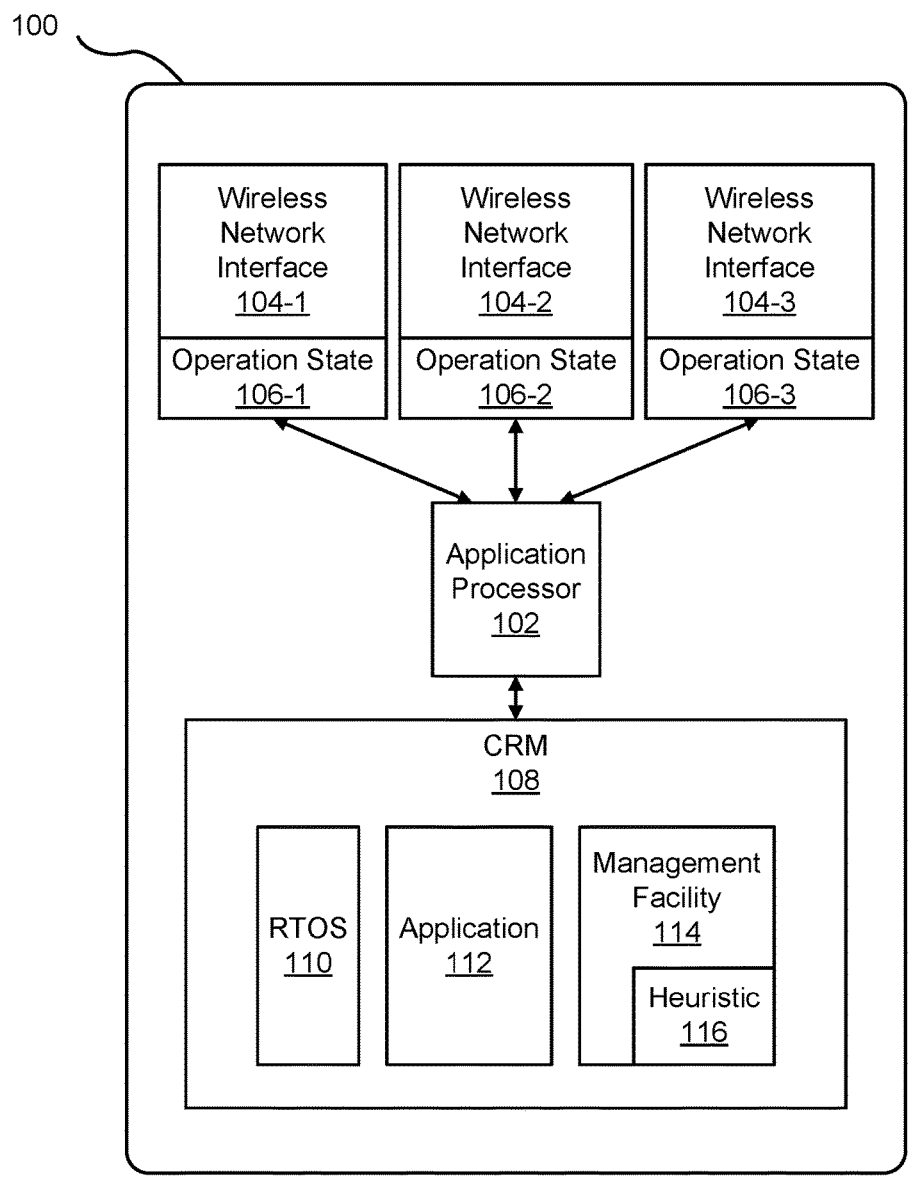
FIG. 1 illustrates an exemplary multi-radio embedded computing device according to principles described herein.

Exemplary systems, methods, and apparatuses for wireless network interface management on a multi-radio embedded computing device are disclosed herein. In certain embodiments, for example, an embedded computing device may include a plurality of wireless network interfaces respectively associated with a plurality of wireless access technologies, an application processor configured to execute instructions of a RTOS, and a wireless network interface management facility configured to direct the application processor to perform one or more of the wireless interface management operations described herein. For instance, the wireless network interface management facility may direct the application processor to detect an operational mode selection command received from an application being executed by the application processor, the operational mode selection command selecting, from a plurality of operational modes, an operational mode of the application. The wireless network interface management facility may further direct the application processor to determine connection statuses of the plurality of wireless network interfaces. The wireless network interface management facility may further direct the application processor to determine, in accordance with a wireless network configuration heuristic, and based on the detected operational mode selection command and the determined connection statuses of the plurality of wireless network interfaces of the embedded computing device, a state configuration for the plurality of wireless network interfaces and to direct the plurality of wireless network interfaces to operate in accordance with the state configuration by directing each wireless network interface within the plurality of wireless network interfaces to operate in accordance with a respective network interface operation state included in the state configuration for the plurality of wireless network interfaces.

The systems, methods, and apparatuses described herein may simplify and/or offload management, by an application executed on an embedded computing device, of a plurality of wireless network interfaces included in the embedded computing device. For example, an application executing on an embedded computing device that includes a plurality of wireless network interfaces may simply select an operational mode (e.g., a "cell only" operational mode, a "standard" operational mode, a "data" operational mode, a "deep sleep" operational mode, etc.) for the application executing on the embedded computing device. An exemplary wireless network interface management facility implemented by the embedded computing device as described herein may detect the operational mode selection command and direct the plurality of network interfaces to operate in accordance with an optimal configuration based on the selected operational mode and detected connection statuses of the plurality of wireless network interfaces. This may reduce the complexity of the application executing on the embedded computing device.

Such reduced complexity may simplify and/or accelerate development of applications for embedded computing devices that include multiple radio access technologies. For example, an application developer may design an application that selects a predefined operational mode from a plurality of operational modes. The application developer may do this without having to design the application to implement a suitable radio access technology management scheme for each and every different embedded computing device (e.g., embedded computing devices having various radio access technology configurations and RTOS platforms) to which the application may potentially be deployed.

The systems, methods, and apparatuses described herein may additionally or alternatively improve the use of computing resources of an embedded computing device. For instance, a wireless network interface management facility as described herein may determine a configuration for a plurality of wireless network interfaces included in an embedded computing device in a manner that optimizes power usage of the embedded computing device. The wireless network interface management facility may then direct the embedded computing device to operate in accordance with the determined configuration, thereby improving the use of computing resources of the embedded computing device (e.g., by conserving power resources of the embedded computing device).

The systems, methods, and apparatuses described herein may additionally or alternatively improve the connectivity of an embedded computing device and/or the use of resources of one or more wireless communications networks to which the embedded computing device is connected. For instance, a wireless network interface management facility as described herein may determine a configuration for a plurality of wireless network interfaces included in an embedded computing device in a manner that optimizes connectivity of the embedded computing device and/or the use of network resources. The wireless network interface management facility may then direct the embedded computing device to operate in accordance with the determined configuration, thereby improving the connectivity of the embedded computing device and/or the use of network resources of one or more wireless communication networks to which the embedded computing device is connected.

As used herein, an "embedded computing device" includes any computing device that includes an application processor that executes instructions of a RTOS. A RTOS may include any operating system that receives and/or processes data in real-time (e.g., deterministically, with minimal delays and/or latency, and/or without buffering delays) in a manner that guarantees certain capabilities within specified time constraints. Examples of a RTOS may include, but are not limited to, FREERTOS, developed and maintained by REAL TIME ENGINEERS LTD of London, England, United Kingdom, REAL-TIME EXECUTIVE FOR MULTIPROCESSOR SYSTEMS (RTEMS), initially developed by OAR CORPORATION of Huntsville, Ala., United States of America, and/or any other suitable RTOS. Thus, an embedded computing device may be a special-purpose computer having one or more dedicated functions and/or operating within real-time computing constraints.

Examples of embedded computing devices may include, without limitation, IoT devices, machine-to-machine ("M2M") devices, wearable devices such as a smart watch device (e.g., an activity tracker device, a biometric device, a monitoring device, etc.), media devices, communications devices, tracking devices, telematics devices, and so on. An embedded computing device may be a standalone device or may be integrated in another device or system such as a monitoring or surveillance system (e.g., a home monitoring system), a vehicle, a consumer electronic device, etc.

Various embodiments will now be described with reference to the figures. The disclosed systems, methods, and apparatuses may provide one or more of the benefits described above and/or various additional and/or alternative benefits that will be made apparent herein.

FIG. 1 illustrates an exemplary embedded computing device 100 ("device 100") according to systems, methods, and apparatuses disclosed herein. As shown in FIG. 1, device 100 may include an application processor 102 communicatively coupled to a plurality of wireless network interfaces 104 (e.g., wireless network interfaces 104-1 through 104-3) having respective network interface operation states 106 ("operation states 106") (e.g., operation states 106-1 through 106-3) and to a non-transitory computer-readable medium 108 ("CRM 108"). CRM 108 may store data (e.g., computing code) representative of a RTOS 110, an application 112, and a wireless network interface management facility 114 ("management facility 114") configured to direct application processor 102 to perform one or more of the operations described herein. Management facility 114 may include a wireless network configuration optimization heuristic 116 ("heuristic 116") that may be used by management facility 114 to manage the operation states 106 of wireless network interfaces 104. Each element of FIG. 1 will now be described.

Application processor 102 may be any suitable embedded processor (e.g., a microprocessor or a microcontroller) configured to execute instructions of a suitable RTOS (e.g., RTOS 110) and instructions of one or more applications (e.g., application 112) executing on device 100. In some embodiments, application processor 102 may include a single physical processor configured to execute and/or manage all instructions related to operation of device 100. Additionally or alternatively, application processor 102 may include one or more specialized, physical processing devices that execute one or more instructions relating to one or more specific functions of device 100. For example, application processor 102 may include a wireless communication processor that executes instructions relating to device 100 communicating with one or more other wireless enabled devices by way of one or more wireless network interfaces 104. As a further example, application processor 102 may include a power management processor that executes instructions relating to management of power resources of device 100.

As shown in FIG. 1, application processor 102 is communicatively coupled to wireless network interfaces 104 (e.g., wireless network interfaces 104-1 through 104-3). Each wireless network interface 104 may include any suitable network transport interface that facilitates data communication to and/or from device 100 by way of a wireless (e.g., radio) access technology. To this end, each wireless network interface 104 may include or be communicatively connected to a radio transceiver configured to send and receive wireless communication signals in accordance with a specific wireless access technology (e.g., a specific wireless communication protocol). Examples of wireless network interfaces may include, but are not limited to, wireless wide area network interfaces (e.g., EVDO, 3G, LTE, LTE Advanced, UMTS, WIMAX, LPWAN, NEUL, WIRELESSHART, 6LOWPAN, SIGFOX, LoRa, etc. network interfaces), wireless local area network interfaces (e.g., 802.11 ("Wi-Fi") network interfaces), wireless personal area network interfaces (e.g., Bluetooth, Wireless USB, ZIGBEE, Z-WAVE, NFC, etc. network interfaces), and/or any other suitable wireless network interfaces.

In some embodiments, one or more of wireless network interfaces 104 may be integrated within device 100, and application processor 102 may communicate with wireless network interfaces 104 by way of an electronic system bus and/or other suitable internal communication connections. In alternative embodiments, one or more of wireless network interfaces 104 may be physically separate from device 100 and configured to communicate with application processor 102 using any suitable wired or wireless communication technology.

By way of illustration, in certain exemplary embodiments, wireless network interface 104-1 may be a Bluetooth network interface, wireless network interface 104-2 may be a Wi-Fi network interface, and wireless network interface 104-3 may be a cellular data network interface. Accordingly, network interface 104-1 may enable device 100 to communicate using Bluetooth signaling technologies, wireless network interface 104-2 may enable device 100 to communicate using Wi-Fi signaling technologies, and wireless network interface 104-3 may enable device 100 to communicate using cellular data signaling technologies. This example is illustrative only. Device 100 may include any suitable configuration of various types of wireless network interfaces 104, including a configuration of wireless network interfaces 104 that supports wireless communications by way of a suitable combination of various radio access technologies, including any of the exemplary radio access technologies disclosed herein. For example, an embedded computing device may include a first wireless network interface for a LPWAN radio access technology (e.g., SIGFOX, LoRa, etc.) and a second wireless network interface for a backup radio access technology, such as a cellular wireless network interface (e.g., an LTE network interface).

Wireless network interfaces 104 may be implemented in any suitable way and/or configuration. As an example, wireless network interfaces 104 may be implemented as separate integrated circuits (e.g., separate chipsets provided by one or more manufacturers) installed in device 100. In other examples, multiple wireless network interfaces 104 may be implemented as one integrated circuit (e.g., on a shared chipset provided by a manufacturer) installed in device 100.

Each wireless network interface 104 may be configured to operate in accordance with an associated operation state 106. For example, wireless network interface 104-1 may operate in accordance with operation state 106-1, wireless network interface 104-2 may operate in accordance with operation state 106-2, and wireless network interface 104-3 may operate in accordance with operation state 106-3. An operation state 106 may define a set of operation parameters that are implemented by an associated wireless network interface 104 when the wireless network interface 104 operates in accordance with the operation state 106. In some examples, an operation state 106 may define a set of power utilization operation parameters that may be implemented by the associated wireless network interface 104 when the wireless network interface 104 operates in accordance with the operation state 106. Such operation states may be referred to as "network interface power operation states." Examples of operation states 106 of wireless network interfaces 104 are described herein.

Application processor 102 may communicate with wireless network interfaces 104 (e.g., wireless network interface 104-1, wireless network interface 104-2, and/or wireless network interface 104-3) to receive communications (e.g., data, signals representative of connection statuses, etc.) from wireless network interfaces 104 and/or to provide communications (e.g., data and/or commands) to wireless network interfaces 104. Application processor 102 may communicate with wireless network interfaces 104 in any way suitable to support the operations described herein. For example, application processor 102 may send a communication to a wireless network interface 104 to query a connection status of the wireless network interface 104 using any suitable communications between application processor 102 and the wireless network interface 104. As another example, application processor 102 may send a communication to a wireless network interface 104 to direct the wireless network interface 104 to operate in accordance with a particular operation state 106 as described herein and using any suitable communications between application processor 102 and the wireless network interface 104.

It will be understood by those skilled in the art that, although FIG. 1 illustrates an exemplary embedded device 100 that includes three wireless network interfaces 104, each with an associated operation state 106, the systems, methods, and apparatuses described herein may be applied to any suitable embedded computing device including any suitable plurality and configuration of wireless network interfaces, each wireless network interface having one or more associated operation states.

As shown in FIG. 1, application processor 102 may also be communicatively coupled to CRM 108. CRM 108 may include any non-transitory processor-readable medium that participates in providing data (e.g., instructions) that may be read and/or executed by application processor 102. Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, and/or any other tangible medium from which application processor 102 can read. CRM 108 may provide and/or store any data as may suit a particular implementation.

As further shown in FIG. 1, CRM 108 may include RTOS 110, application 112, and management facility 114 that includes heuristic 116. RTOS 110 may be any suitable RTOS that may provide instructions in real-time for execution by application processor 102. Examples of suitable real-time operating systems are described herein.

Application 112 may be any application that may be executed by application processor 102 and that, when executed, may select, from a plurality of data communication operational modes, a data communication operational mode of the application. A data communication operational mode, or simply an "operational mode," may indicate a predefined mode of data communication to be used by application 112 and/or management facility 114.

An example of an operational mode may include a "standard" operational mode, which application 112 may select to indicate that application 112 is ready to send and/or receive data by way of an available wireless network interface (e.g., at least one of wireless network interfaces 104). In this mode, outgoing data (e.g., from application 112) may be available for transmission by way of at least one of wireless network interfaces 104 and/or incoming data (e.g., from at least one of wireless network interfaces 104) may be available for reception and processing by application processor 102 at any time (e.g., within the next second), and/or data may never become available for transmission and/or processing. Thus, in "standard" mode, application 112 may be in a standby or idle state, ready to provide data to be transmitted by wireless network interfaces 104 and/or to receive and process data from wireless network interfaces 104.

Another example of an operational mode that may be selected by application 112 may be a "data" operational mode, which application 112 may select to indicate that application 112 is currently sending and/or receiving data over a wireless network connection 104, or to indicate that application 112 is processing a backlog of data from an extended period of data exchange by way of a wireless network connection 104.

Another example of an operational mode that may be selected by application 112 may be a "deep sleep" operational mode, which application 112 may select to indicate that application 112 prioritizes wireless network and/or device power consumption reduction over timely reception of data. Management facility 114 may, for the purpose of reducing wireless network and/or device power consumption, direct application processor 102 to reduce the frequency of checking for data reception on a wireless network interface 104 or alternatively limit the active wireless network (e.g., to a limited, predetermined wireless network interface). Application 112 may select this operational mode of application 112 when, for example, application 112 has been without data to send or receive (e.g., by way of a wireless network interface 104) for at least a predefined period of time (e.g., ten minutes).

A further example of an operational mode that may be selected by application 112 may be a "cell only" operational mode, which application 112 may select to indicate that application 112 may send or receive data only by way of a wireless network interface 104 that is a cellular network interface (e.g., application 112 may not send or receive data by way of wireless network interfaces that are not cellular data network interfaces, such as Wi-Fi wireless network interfaces, Bluetooth wireless network interfaces, etc.).

In certain examples, a plurality of selectable operational modes may include a defined set that includes the "standard" mode, "data" mode, "deep sleep" mode, and "cell only" mode described herein and from which application 112 may select one mode at a time in which to operate for data communications by way of wireless network interfaces 104. Such operational modes and sets of operational modes are exemplary. In other examples, a plurality of selectable operational modes may include a different defined set of operational modes. Application 112 may select an operational mode from any suitable set of operational modes customized to suit a particular implementation.

Application 112 may be provided by an entity for installation and/or execution on device 100. For example, application 112 may be developed by a manufacturer of device 100 or by any other entity. Application 112 may be stored by CRM 108 in any suitable form, such as application computing code (e.g., a software program, firmware, etc.).

Management facility 114 includes one or more instructions that, when executed by application processor 102, may direct application processor 102 to perform one or more operations associated with wireless network interface management on device 100. In this way, management facility 114 may be said to perform the one or more operations associated with wireless network interface management on device 100. In certain examples, management facility 114 may perform one or more wireless network interface management operations to provide an interface between application 112 and wireless network interfaces 104 on device 100. This may simplify and/or offload wireless network interface management by application 112, thereby reducing complexity of application 112, reducing development complexity of application 112, making application 112 viable for large scale deployment to a variety of differently configured embedded devices, and/or optimizing wireless network interface management and/or resource usage.

Additionally or alternatively, management facility 114 may simplify and/or offload wireless network interface management by individual wireless network interfaces 104 by abstracting wireless network interface management away from software (e.g., drivers) of individual wireless network interfaces 104. Such abstraction of wireless network interface management away from the wireless network interfaces 104 may improve the effectiveness, reliability, and/or safety of wireless network interface management, particularly with respect to management of power used by the wireless network interfaces 104. In certain implementations, management facility 114 may abstract wireless network interface management to an application level of an embedded computing device (e.g., management facility 114 is executable and/or directs operations of application processor 102 of an embedded computing device). At the application level, management facility 114 may be conveniently leveraged by application 112 and/or may coordinate operation of various configurations of multiple wireless network interfaces of an embedded computing device.

Management facility 114 may be implemented in any suitable way. For example, in some implementations, management facility 114 may be a static library of executable code that application 112 may be linked with, e.g., at compile-time. Additionally or alternatively, management facility 114 may be a shared library (e.g., a dynamic-link library, etc.) that application processor 102 may load into memory at run-time. In additional or alternative implementations, management facility 114 may be another application that application processor 102 may execute concurrently (e.g., as a separate process) with application 112. In such implementations, application 112 and management facility 114 may communicate using any suitable inter-process communication facility of application processor 102 and/or RTOS 110 (e.g., an inter-process communication socket, a named and/or unnamed pipe, etc.).

In certain implementations, management facility 114 and application 112 may be separate modules, and application 112 may be designed to utilize functionality of management facility 114 to manage wireless network interfaces 104. In certain examples, application 112 may utilize functionality of management facility 114 by selecting to operate in accordance with an operational mode, such as by selecting any of the operational modes of application 112 described herein. The selection of an operational mode by application 112 may include application 112 providing an operational mode selection command that directs application 112 to operate according to an operational mode. For example, an operational mode selection command may direct application 112 to operate according to a "cell only" mode, or according to any other operational mode as described herein.

Management facility 114 may detect that application 112 selects to operate in accordance with an operational mode of application 112 and/or management facility 114, such as by detecting an operational mode selection command from application 112. Management facility 114 may detect an operational mode selection command from application 112 in any manner as may suit a particular implementation. For example, application 112 may store an operational mode selection command as data within CRM 108, such as within data included in RTOS 110, application 112, management facility 114, and/or within any other suitable data storage location within CRM 108. Management facility 114 may detect the operational mode selection command by accessing the data stored by CRM 108 that is representative of the operational mode selection command. As another example, application 112 may provide a communication and/or data representative of an operational mode selection command directly to management facility 114 and/or application processor 102 for detection by management facility 114.

Management facility 114 may determine connection statuses of wireless network interfaces 104. A connection status of a wireless network interface (e.g., any of wireless network interfaces 104-1 through 104-3) may be any information that indicates a status of a wireless network interface, a relation of a wireless network interface to an associated network medium, and/or a capability or readiness of the suitable network medium (e.g., network conditions, network signal strength, etc.) to send and/or receive data from and/or to device 100 by way of the wireless network interface. Examples of management facility 114 determining certain exemplary connection statuses will now be described.

In certain examples, management facility 114 may determine that a suitable network medium for a wireless network interface 104 is available to be connected to by the wireless network interface 104. In response to the detecting of the availability of the suitable network medium, management facility 114 may determine that the wireless network interface 104 has a connection status of "network available."

In certain examples, management facility 114 may determine that a suitable network medium is not available to be connected to by a wireless network interface 104. In response, management facility 114 may determine that the wireless network interface 104 has a connection status of "network not available."

In certain examples, a wireless network interface 104 may be connected to a suitable network medium. Management facility 114 may detect that the wireless network interface 104 is connected to the suitable network medium and determine that the wireless network interface 104 has a connection status of "connected."

In certain examples, a wireless network interface 104 may not be connected to a suitable network medium. In such examples, management facility 114 may detect that the wireless network interface 104 is not connected to the suitable network medium and determine that wireless network interface 104 has a connection status of "disconnected."

Additionally or alternatively, a connection status of a wireless network interface 104 may indicate one or more network conditions of a network to which the wireless network interface 104 is connected. For example, a wireless network interface 104 may be connected to a network that is capable of sending and/or receiving data from and/or to device 100 within a set of predefined performance parameters. In such examples, management facility 114 may determine that the wireless network interface 104 has a connection status of "connected with optimum network conditions."

In other examples, a wireless network interface 104 may be connected to a network that is not capable of sending and/or receiving data from and/or to device 100 within the set of predefined performance parameters. In such examples, management facility 114 may determine that the wireless network interface 104 has a connection status of "connected without optimum network conditions."

The above-described connection statuses are exemplary. Management facility 114 may determine that a wireless network interface (e.g., wireless network interfaces 104-1 through 104-3) has any additional and/or alternative connection statuses as may suit a particular implementation.

Management facility 114 may determine connection statuses of wireless network interfaces 104 in any suitable way as may suit a particular implementation. For example, management facility 114 may send a query to wireless network interfaces 104 (e.g., by way of application processor 102) requesting information representative of connection statuses of wireless network interfaces 104. Management facility 114 may then receive, from wireless network interfaces 104 in response to the query, information representative of connection statuses of wireless network interfaces 104. Additionally or alternatively, management facility 114 may access information representative of connection statuses of wireless network interfaces 104 from a suitable storage medium (e.g., CRM 108) and/or receive information representative of connection statuses of wireless network interfaces 104 from any suitable information source.

Management facility 114 may determine a network interface state configuration ("state configuration") for wireless network interfaces 104. A state configuration may specify a set of specific operation states 106 for wireless network interfaces 104 included in device 100. For example, a state configuration may define a specific operation state 106 for each wireless network interface 104 included in device 100, such as a set of operation states 106 that includes a specific operation state 106-1 for wireless network interface 104-1, a specific operation state 106-2 for wireless network interface 104-2, and a specific operation state 106-3 for wireless network interface 104-3. A state configuration may include all or any subset of the operation states 106 described herein. Examples of operation states 106 of wireless network interfaces 104 will now be described.

A wireless network interface 104 may operate in an "on" operation state. While in the "on" operation state, the wireless network interface 104 may operate with full functionality, which may include, but is not limited to, a capability to establish and/or maintain an active data connection to another network-enabled device by way of a suitable network medium. In the "on" operation state, the wireless network interface 104 may be transmitting data to and/or receiving data from another network-enabled device by way of a suitable network medium.

Additionally or alternatively, a wireless network interface 104 may operate in an "off" operation state. While in the "off" operation state, the wireless network interface 104 may operate in a lowest possible power state, preferably with no current draw in addition to a minimal current draw necessary to operate in the lowest possible power state.

Additionally or alternatively, a wireless network interface 104 may operate in a "sleep" operation state. While in the "sleep" operation state, the wireless network interface 104 may operate with only limited functionality and/or limited connectivity to a suitable network medium.

Additionally or alternatively, a wireless network interface 104 may operate in a "standby" operation state. While in the "standby" operation state, the wireless network interface 104 may operate with increased functionality than when operating in a "sleep" operation state, but may not be actively communicating data to and/or receiving data from another device by way of a suitable network medium.

Additionally or alternatively, a wireless network interface 104 may operate in a "scanning" operation state (also "scan" operation state). While in the "scanning" operation state, the wireless network interface 104 may connect to a physical layer (e.g., a suitable wireless access network or medium) to scan for devices (e.g., network access devices and/or peer networking devices) to which device 100 may connect by way of the wireless network interface 104.

Management facility 114 may direct wireless network interfaces 104 to operate in accordance with any of the exemplary operation states described herein. Management facility 114 may direct wireless network interfaces 104 to operate in accordance with operation states 106 in any suitable way, such as by directing each wireless network interface 104 to operate in accordance with a specific, corresponding operation state 106. To illustrate, after management facility 114 determines a state configuration that includes a set of operation states 106 for wireless network interfaces 104, management facility 114 may direct application processor 102 to direct each of the wireless network interfaces 104 to operate according to a respective operation state 106 included in the state configuration.

As an example, management facility 114 may determine a state configuration for wireless network interfaces 104 that designates an "off" operation state for wireless network interface 104-1, an "off" operation state for wireless network interface 104-2, and a "sleep" operation state for wireless network interface 104-3. Based on (e.g., in response to) the determination of the state configuration for wireless network interfaces 104, management facility 114 may assign operation state 106-1 to an "off" operation state, operation state 106-2 to an "off" operation state, and operation state 106-3 to a "sleep" operation state. By making these assignments, management facility 114 directs wireless network interface 104-1 to operate according to an "off" operation state, wireless network interface 104-2 to operate according to an "off" operation state, and wireless network interface 104-3 to operate according to a "sleep" operation state.

The above-described examples of operation states of wireless network interfaces are exemplary. Management facility 114 may direct wireless network interfaces 104 to operate in accordance with additional or alternative operation states as may suit a particular implementation.

Management facility 114 may determine a state configuration for wireless network interfaces 104 according to heuristic 116. Heuristic 116 may specify a set of criteria that management facility 114 may use to identify and/or select a state configuration for wireless network interfaces 104 based on a detected operational mode selection command from application 112 and on determined connection statuses of wireless network interfaces 104. Examples of such criteria and how management facility 114 may use the criteria to determine a state configuration for wireless network interfaces 104 based on a detected operational mode selection command from application 112 and detected connection statuses of wireless network interfaces 104 will now be described in reference to FIGS. 2-4.

Figure 2:
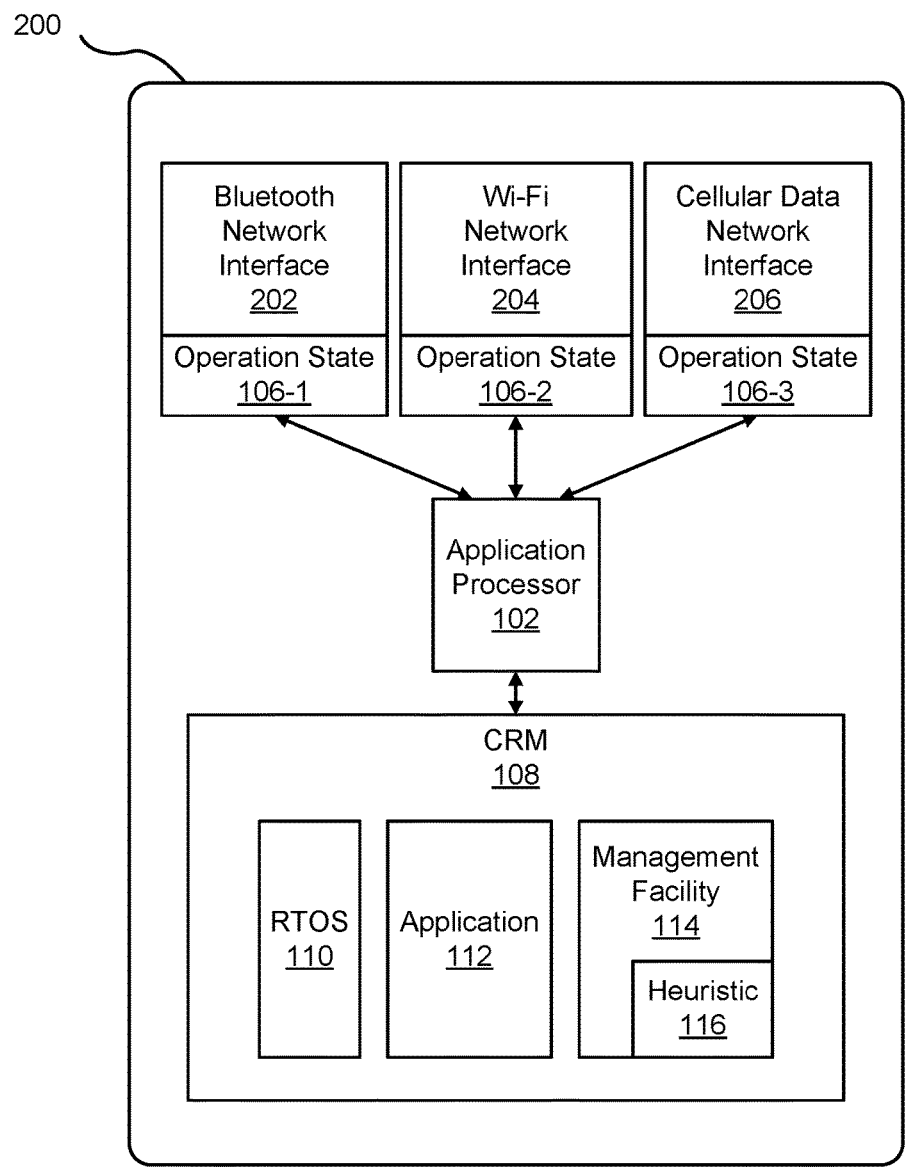
FIG. 2 illustrates an exemplary implementation of a multi-radio embedded computing device according to principles described herein.

FIG. 2 shows an exemplary implementation 200 of device 100. As shown, implementation 200 includes the elements of device 100 with wireless network interfaces 104-1, 104-2, and 104-3 being a Bluetooth network interface 202, a Wi-Fi network interface 204, and a cellular data network interface 206, respectively. As in device 100, each wireless network interface in implementation 200 is associated with a respective operation state 106: Bluetooth network interface 202 is associated with operation state 106-1, Wi-Fi network interface 204 is associated with operation state 106-2, and cellular data network interface 206 is associated with operation state 106-3. While certain examples described herein are presented in reference to implementation 200, these examples are illustrative only. The same or similar principles described in reference to implementation 200 may be applicable to alternative implementations of multi-radio embedded computing devices having other combinations of wireless network interfaces that use other radio access technologies.

In some embodiments, heuristic 116 may include a predefined mapping of operational modes of application 112, connection statuses of wireless network interfaces 104 (e.g., Bluetooth network interface 202, Wi-Fi network interface 204, and cellular data network interface 206 of implementation 200 of device 100), and operation states of the wireless network interfaces 104. By way of illustration, FIG. 3 shows an exemplary predefined mapping 300 ("mapping 300") of operational modes, connection statuses, and operation states for Bluetooth network interface 202, Wi-Fi network interface 204, and cellular data network interface 206 of implementation 200 of device 100. Management facility 114 may use mapping 300 to determine a state configuration for implementation 200 of device 100.

Mapping 300 may be represented as a matrix having rows and columns that include data values arranged to represent mapped relationships between operational modes, connection statuses, and operation states. In FIG. 3, for example, mapping 300 includes a mode column 302 that indicates operational modes selectable by application 112, a connection statuses column 304 that indicates various combinations of connection statuses of Bluetooth network interface 202 (also "BT 202"), Wi-Fi network interface 204 (also "Wi-Fi 204"), and cellular data network interface 206 (also "Cell 206") that may be detected by management facility 114, and a state configuration column 306 that indicates state configurations that may be determined by management facility 114 based on a detection of an operational mode selection command selecting one of the operational modes indicated in column 302 and a determination of one of the combinations of connection statuses indicated in column 304. As shown, each state configuration includes an operation state for Bluetooth network interface 202, an operation state for Wi-Fi network interface 204, and an operation state for cellular data network interface 206.

Mapping 300 also includes a plurality of rows 312, 314, 316, and 318 that correspond to the operational modes indicated in mode column 302 (e.g., which may include a set of operational mode selection commands of application 112). Each row includes a plurality of sub-rows (e.g., sub-rows 312-1 and 312-2, sub-rows 314-1 through 314-3, sub-rows 316-1 through 316-5, and sub-rows 318-1 through 318-4), with each sub-row corresponding to a state configuration in column 306 that management facility 114 may determine based on a detection of an operational mode selection command shown in mode column 302 and a determination of a combination of connection statuses of Bluetooth network interface 202, Wi-Fi network interface 204, and/or cellular data network interface 206 shown in connection statuses column 304.

Row 312 indicates exemplary mappings of state configurations to a "cell only" operational mode of application 112 and combinations of connections statuses of BT 202, Wi-Fi 204, and Cell 206 wireless network interfaces. Specifically, sub-row 312-1 indicates that when management facility 114 detects a "cell only" operational mode selection command from application 112 and determines that Bluetooth network interface 202 has a connection status of "network not available," Wi-Fi network interface 204 has a connection status of "network not available," and cellular network interface 206 has a connection status of "network available," management facility 114 may determine a state configuration that includes an "off" operation state for Bluetooth network interface 202, an "off" operation state for Wi-Fi network interface 204, and an "on" operation state for cellular data network interface 206. Sub-row 312-2 indicates that when management facility 114 detects a cell only mode operational mode selection command from application 112 and determines that Bluetooth network interface 202, Wi-Fi network interface 204, and cellular network interface 206 have connection statuses of "network not available," management facility 114 may determine a state configuration that includes "off" operation states for Bluetooth network interface 202, Wi-Fi network interface 204, and cellular data interface 206.

Row 314 indicates exemplary mappings of state configurations to a "data" operational mode of application 112 and combinations of connections statuses of BT 202, Wi-Fi 204, and Cell 206 wireless network interfaces. Specifically, sub-row 314-1 indicates that when management facility 114 detects a "data" operational mode selection command from application 112 and determines that Bluetooth network interface 202 has a connection status of "connected," management facility 114 may determine a state configuration that includes an "on" operation state for Bluetooth network interface 202 and "scan" operation states for Wi-Fi network interface 204 and cellular data network interface 206. Sub-row 314-2 indicates that when management facility 114 detects a "data" operational mode selection command from application 112 and determines that Wi-Fi network interface 204 has a connection status of "connected," management facility 114 may determine a state configuration that includes an "off" operation state for Bluetooth network interface 202, an "on" operation state for Wi-Fi network interface 204, and a "scan" operation state for cellular data network interface 206. Sub-row 314-3 indicates that when management facility 114 detects a "data" operational mode selection command from application 112 and determines that Bluetooth network interface 202 has a connection status of "network not available," Wi-Fi network interface 204 has a connection status of "network not available," and cellular data network interface 206 has a connection status of "network available," management facility 114 may determine a state configuration that includes an "off" operation state for Bluetooth network interface 202, a "scan" operation state for Wi-Fi network interface 204, and an "on" operation state for cellular data network interface 206.

Row 316 indicates exemplary mappings of state configurations to a "standard" operational mode of application 112 and combinations of connections statuses of BT 202, Wi-Fi 204, and Cell 206 wireless network interfaces. Specifically, sub-row 316-1 indicates that when management facility 114 detects a "standard" operational mode selection command from application 112 and determines that Bluetooth network interface 202 has a connection status of "connected," management facility 114 may determine a state configuration that includes an "on" operation state for Bluetooth network interface 202, an "off" operation state for Wi-Fi network interface 204, and a "sleep" operation state for cellular data network interface 206. Sub-row 316-2 indicates that when management facility 114 detects a "standard" operational mode selection command from application 112 and determines that Bluetooth network interface 202 has a connection status of "network not available" and Wi-Fi network interface 204 has a connection status of "network available," management facility 114 may determine a state configuration that includes an "off" operation state for Bluetooth network interface 202, an "on" operation state for Wi-Fi network interface 204, and a "sleep" operation state for cellular data network interface 206. Sub-row 316-3 indicates that when management facility 114 detects a "standard" operational mode selection command from application 112 and determines that Wi-Fi network interface 204 has a connection status of "connected," management facility 114 may determine a state configuration that includes an "off" operation state for Bluetooth network interface 202, an "on" operation state for Wi-Fi network interface 204, and a "sleep" operation state for cellular data network interface 206. Sub-row 316-4 indicates that when management facility 114 detects a "standard" operational mode selection command from application 112 and determines that Bluetooth network interface 202 has a connection status of "network not available," Wi-Fi network interface 204 has a connection status of "network not available," and cellular data network interface 206 has a connection status of "network available," management facility 114 may determine a state configuration that includes an "off" operation state for Bluetooth network interface 202, an "off" operation state for Wi-Fi network interface 204, and a "standby" operation state for cellular data network interface 206. Sub-row 316-5 indicates that when management facility 114 detects a "standard" operational mode selection command from application 112 and determines that Bluetooth network interface 202, Wi-Fi network interface 204, and cellular data network interface 206 have connection statuses of "network not available," management facility 114 may determine a state configuration that includes "off" operation states for Bluetooth network interface 202, Wi-Fi network interface 204, and cellular data network interface 206.

Row 318 indicates exemplary mappings of state configurations to a "deep sleep" operational mode of application 112 and combinations of connections statuses of BT 202, Wi-Fi 204, and Cell 206 wireless network interfaces. Specifically, sub-row 318-1 indicates that when management facility 114 detects a "deep sleep" operational mode selection command from application 112 and determines that Bluetooth network interface 202 has a connection status of "connected," management facility 114 may determine a state configuration that includes a "sleep" operation state for Bluetooth network interface 202 and "off" operation states for Wi-Fi network interface 204 and cellular data network interface 206. Sub-row 318-2 indicates that when management facility 114 detects a "deep sleep" operational mode selection command from application 112 and determines that Wi-Fi network interface 204 has a connection status of "connected," management facility 114 may determine a state configuration that includes an "off" operation state for Bluetooth network interface 202, a "sleep" operation state for Wi-Fi network interface 204, and an "off" operation state for cellular data network interface 206. Sub-row 318-3 indicates that when management facility 114 detects a "deep sleep" operational mode selection command from application 112 and determines that Bluetooth network interface 202 has a connection status of "network not available," Wi-Fi network interface 204 has a connection status of "network not available," and cellular data network interface 206 has a connection status of "network available," management facility 114 may determine a state configuration that includes "off" operation states for Bluetooth network interface 202, Wi-Fi network interface 204, and cellular data network interface 206. Sub-row 318-4 indicates that when management facility 114 detects a "deep sleep" operational mode selection command from application 112 and determines that Bluetooth network interface 202, Wi-Fi network interface 204, and cellular data network interface 206 have connection statuses of "network not available," management facility 114 may determine a state configuration that includes "off" operation states for Bluetooth network interface 202, Wi-Fi network interface 204, and cellular data network interface 206.

One or more of the mappings specified by heuristic 116 may be configured to facilitate resource consumption (e.g., power consumption) and/or wireless connectivity of device 100. For example, one or more mappings specified by heuristic 116 may be configured to prioritize wireless network interfaces 104 relative to one another for a certain operational mode, automatically close connections and transition an operation state of a wireless network interface 104 to another operation state after a predefined period of inactivity, periodically scan for availability of a more efficient (e.g., lower power usage) wireless network, reject new wireless connection requests for a certain operational mode, and/or to direct management facility 114 to perform any other operation to facilitate resource consumption and/or wireless connectivity of device 100.

The specific relationships specified by mapping 300 in FIG. 3 are exemplary. Heuristic 116 may include any additional or alternative predefined mappings of operational modes, connection statuses, and operation states that management facility 114 may use to determine a state configuration for a plurality of wireless network interfaces 104 as may suit a particular implementation.

In certain embodiments, heuristic 116 may include criteria configured to direct management facility 114 to determine a state configuration for wireless network interfaces in a manner that prioritizes communications by way of one or more radio access technologies relative to one or more other radio access technologies. For example, heuristic 116 may include criteria configured to direct management facility 114 to determine a state configuration for wireless network interfaces in a manner that prioritizes communications by way of, in descending order of priority based on detected connection statuses of the wireless network interfaces, a cellular data network interface, a Wi-Fi network interface, and a Bluetooth network interface. In certain examples, heuristic 116 may include such prioritization criteria for one or more of the operational modes described herein, such as for a "data" operational mode specifically. In certain examples, such a prioritization may be set as a default prioritization that may be modified by a developer of application 112, management facility 114, and/or device 100 to provide a different prioritization order of wireless network interfaces 104.

In certain embodiments, heuristic 116 may include criteria configured to direct management facility 114 to determine a new state configuration for wireless network interfaces 104 at the expiration of a predetermined duration of time. As an example, management facility 114 may detect a "cell only" mode of application 112 and a connection status of "network not available" for cellular data network interface 206, and based on this detection may determine a state configuration in which Bluetooth network interface 202, Wi-Fi network interface 204, and cellular data network interface 206 are assigned "off" operation states. Heuristic 116 may include criteria that direct management facility 114 to transition from this state configuration to a new state configuration in which cellular data network interface 206 is assigned a "scanning" operation state to detect network availability periodically (e.g., every predefined length of time such as every five minutes).

As another example, management facility 114 may direct the wireless network interfaces 104 of implementation 200 of device 100 to operate in accordance with a state configuration that includes an "off" operation state for Bluetooth network interface 202, such as a state configuration that includes an "off" operation state for Bluetooth network interface 202, an "on" operation state for Wi-Fi network interface 204, and a "scan" operation state for cellular data network interface 206. Heuristic 116 may include criteria configured to direct management facility 114 to "wake up" Bluetooth network interface 202 to scan for an available Bluetooth network medium at the expiration of a predetermined duration of time (e.g., every five or ten minutes). At the expiration of the predetermined duration of time, management facility 114 may determine a new state configuration for the wireless network interfaces of implementation 200 of device 100 that includes a "scan" operation state for Bluetooth network interface 202, such as a state configuration that includes a "scan" operation state for Bluetooth network interface 202, an "on" operation state for Wi-Fi network interface 204, and a "scan" operation state for cellular data network interface 206. Management facility 114 may then direct the wireless network interfaces 104 of implementation 200 of device 100 to operate in accordance with the determined state configuration in any of the ways described herein.

Similar to the above-described examples, heuristic 116 may include any suitable criteria configured to direct management facility 114 to periodically "wake up" any wireless network interface 104 from an "off" operation state or a "deep sleep" operation state to scan for network availability. Such criteria may be specific to any state configuration specified by heuristic 116.

Additionally or alternatively, heuristic 116 may be based on a resource consumption model of device 100. To this end, heuristic 116 may include criteria configured to direct management facility 114 to determine a new state configuration for wireless network interfaces 104 based on an anticipated power consumption of device 100. For example, heuristic 116 may include criteria that indicates that a Wi-Fi network interface (e.g., Wi-Fi network interface 204) may use less power during operation than a cellular data network interface (e.g., cellular data interface 206). Heuristic 116 may therefore direct management facility 114 to determine a new state configuration for wireless network interfaces 104 that prioritizes establishing and/or maintaining a connection to a Wi-Fi network medium by way of a Wi-Fi network interface (e.g., Wi-Fi network interface 204) over establishing and/or maintaining a connection to a cellular data network medium by way of a cellular data network interface (e.g., cellular data network interface 206).

By way of illustration, management facility 114 may detect a "standard" operational mode selection command from application 112, and may determine a connection status of "network not available" for Bluetooth network interface 202, a connection status of "network available" for Wi-Fi network interface 204, and a connection status of "network available" for cellular data network interface 206. Heuristic 116 may direct management facility 114 to determine a state configuration for implementation 200 of device 100 that prioritizes establishing and/or maintaining a connection to a Wi-Fi network medium over a cellular network medium by directing management facility 114 to determine a state configuration that includes an "off" operation state for Bluetooth network interface 202, an "on" operation state for Wi-Fi network interface 204, and an "off" operation state for cellular data network interface 206.

As another example, heuristic 116 may include criteria that indicate a relative power consumption of each wireless network interface 104 when operating in each operation state. For example, heuristic 116 may include criteria that indicates that wireless network interface 104-1 (e.g., Bluetooth network interface 202) consumes more power when operating in accordance with an "on" operation state than wireless network interface 104-2 (e.g., Wi-Fi network interface 204) consumes when operating in accordance with a "standby" operation state. Management facility 114 may utilize this relative power consumption criteria to determine a new state configuration for wireless network interfaces 104 that conserves power resources of device 100.

As a further illustration, management facility 114 may detect a "standard" operational mode selection command from application 112, and may determine a connection status of "connected" for Bluetooth network interface 202, a connection status of "network available" for Wi-Fi network interface 204, and a connection status of "network not available" for cellular data network interface 206. Bluetooth network interface 202 may be operating in accordance with an "on" operation state, Wi-Fi network interface 204 may be operating in accordance with a "standby" operation state, and cellular data network interface 206 may be operating in accordance with an "off" operation state. Heuristic 116 may include criteria that indicate that Wi-Fi network interface 204 consumes less power when operating in accordance with an "on" operation state than Bluetooth network interface 202 consumes when operating in accordance with an "on" operation state, and that Bluetooth network interface 202 consumes less power when operating in accordance with a "standby" operation state than Wi-Fi network interface 204 consumes when operating in accordance with an "on" operation state. Heuristic 116 may direct management facility 114 to determine a state configuration for implementation 200 of device 100 that conserves power resources of implementation 200 of device 100 by directing management facility 114 to determine a state configuration that includes a "standby" operation state for Bluetooth network interface 202, an "on" operation state for Wi-Fi network interface 204, and an "off" operation state for cellular data network interface 206.

In certain embodiments, management facility 114 may be configured to go to "sleep" in a low-power state after inactivity for a predefined length of time. While management facility 114 is in the "sleep" state, application 112 may provide an operational mode selection command, such as an operational mode associated with a request for a data connection. Management facility 112 may detect the operational mode selection command and, in response, "wake up" a last known wireless network interface 104, such as the wireless network interface 104 that last had a "connected" or a "network available" connection status.

In certain embodiments, when management facility 114 is operating in accordance with a selected "standard" operational mode and a wireless network interface 104 is in an "on" operation state but has been idle for at least a predefined length of time, management facility 114 may automatically close all connections on the wireless network interface 104 and transition the wireless network interface 104 to a "standby" or an "off" operation state.

In certain embodiments, when management facility 114 is operating in accordance with a selected "standard" operational mode and is not using a Wi-Fi network interface (e.g., Wi-Fi network interface 204), management facility 114 may automatically transition the Wi-Fi network interface to a "scanning" operation state to periodically detect network availability.

In certain embodiments, when management facility 114 is operating in accordance with a selected "deep sleep" operational mode, management facility 114 may automatically set a Wi-Fi network interface and a cellular network interface to an "off" operation state such that the Wi-Fi network interface and the cellular network are not available for use. With the Wi-Fi network interface and the cellular network interface in "off" operation states, new connection requests to the interfaces will be rejected.

In certain embodiments, when management facility 114 is operating in accordance with a selected "deep sleep" operational mode, management facility 114 may automatically and periodically (e.g., every ten minutes) transition only a Bluetooth network interface to a "scanning" operation state to detect network availability and wait for connection attempts.

In certain embodiments, when management facility 114 is operating in accordance with a selected "deep sleep" operational mode and a Bluetooth network interface operates in accordance with an "on" operation state but has been idle for at least a predefined length of time (e.g., three minutes), management facility 114 may automatically close all connections on the Bluetooth network interface and transition the Bluetooth network interface to a "sleep" operation state.

In certain embodiments, when management facility 114 is operating in accordance with a selected "deep sleep" operational mode and a Bluetooth low-energy network interface connects to a Bluetooth low-energy stack of management facility 114, management facility 114 may transition the Bluetooth network interface to an "on" operation state.

The above-described examples of criteria specified by heuristic 116 and/or operations performed by management facility 114 are exemplary. Heuristic 116 may include any additional and/or alternative criteria configured to direct management facility 114 to determine a new state configuration and/or perform one or more additional or alternative network management operations for wireless network interfaces 104.

Figure 4:
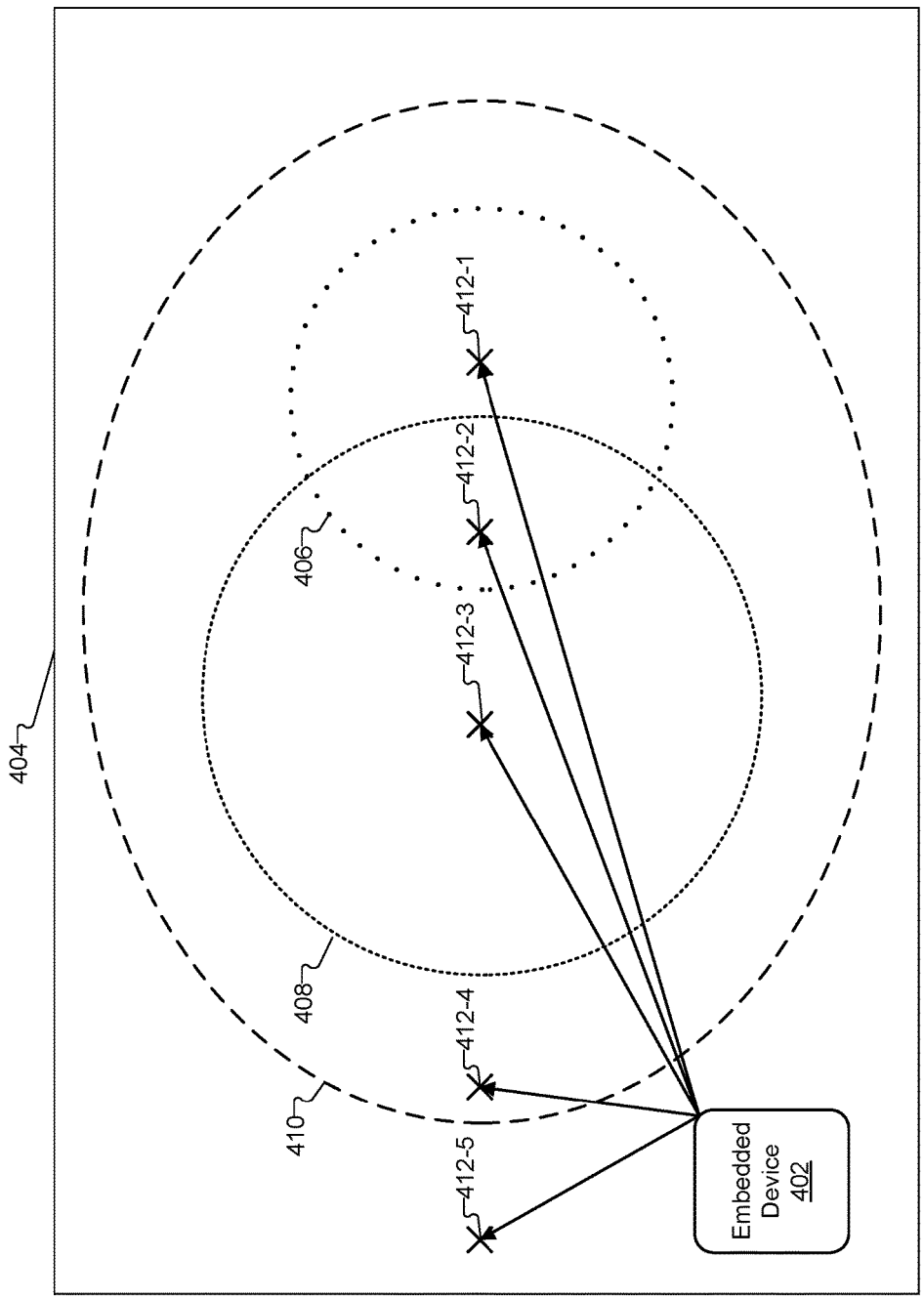
FIG. 4 illustrates an example of wireless network interface management in reference to movement of a multi-radio embedded computing device with respect to geographic footprints of a plurality of wireless networks according to principles described herein.

FIG. 4 illustrates an example of wireless network interface management in reference to movement of a multi-radio embedded computing device with respect to geographic footprints of a plurality of wireless networks according to principles described herein. FIG. 4 shows an exemplary embedded computing device 402 ("device 402") located within a geographic area 404. Geographic area 404 includes a Bluetooth service area 406, a Wi-Fi service area 408, and a cellular service area 410. FIG. 4 also shows geographic locations 412 (e.g., geographic locations 412-1 through 412-5) located within geographic area 404. Each of these elements will now be described.

Device 402 may be any suitable embedded computing device as described herein, such as an implementation of device 100 as configured in implementation 200. Device 402 may be portable within geographic area 404. Geographic area 404 may include any suitable geographic area. Device 402 may move within geographic area 404 in any suitable manner (e.g., as a user carries device 402 while the user travels within geographic area 404) at any suitable time. Bluetooth service area 406, Wi-Fi service area 408, and cellular service area 410 illustrate exemplary network footprints within geographic area 404. When device 402 moves within geographic area 404, management facility 114 may perform any of the operations described herein to manage the wireless network interfaces 104 (e.g., Bluetooth network interface 202, Wi-Fi network interface 204, and/or cellular data network interface 206) of device 402.

Bluetooth service area 406 represents a geographic area in which device 402 may detect and/or connect to a Bluetooth network medium by way of Bluetooth wireless network interface 202. Wi-Fi service area 408 represents a geographic area in which device 402 may detect and/or connect to a Wi-Fi network medium by way of Wi-Fi wireless network interface 204. Cellular service area 410 represents a geographic area in which device 402 may detect and/or connect to a cellular data network medium by way of cellular data wireless network interface 206.

As shown in FIG. 4, Bluetooth service area 406, Wi-Fi service area 408, and/or cellular service area 410 may overlap each other in any way and/or in any combination. In other embodiments, each of Bluetooth service area 406, Wi-Fi service area 408, and/or cellular service area 410 may represent unique and/or geographically separate geographic areas.

Geographic locations 412 (or "locations 412") represent locations within geographic area 404 positioned relative to Bluetooth service area 404, Wi-Fi service area 408, and/or cellular service area 410. Device 402 may be geographically located at any one of geographic locations 412 at any particular time.

Location 412-1 represents a geographic location within Bluetooth service area 404, outside of Wi-Fi service area 408, and within cellular service area 402. While device 402 is located at geographic location 412-1, management facility 114 may detect a "standard" operational mode selection command from application 112 and determine a connection status of "connected" for Bluetooth network interface 202. Management facility 114 may then determine, in accordance with mapping 300 (e.g., sub-row 316-1) of heuristic 116 and based on the detected "standard" operational mode selection command and the determined "connected" connection status of Bluetooth network interface 202, a state configuration for Bluetooth network interface 202, Wi-Fi network interface 204, and cellular data network interface 206 that includes an operation state of "on" for Bluetooth network interface 202, an operation state "off" for Wi-Fi network interface 204, and an operation state of "sleep" for cellular data network interface 206. Management facility 114 may then direct Bluetooth network interface 202, Wi-Fi network interface 204, and/or cellular data network interface 206 to operate in accordance with the operation states of the determined state configuration in any of the ways described herein.

Location 412-2 represents a geographic location within Bluetooth service area 404, within Wi-Fi service area 408, and within cellular service area 410. While device 402 is at geographic location 412-2 (e.g., after device 402 is moved from geographic location 412-1 to geographic location 412-2), management facility 114 may detect a "standard" operational mode selection command from application 112 and determine connection statuses of "connected" for Bluetooth network interface 202 and "network available" for Wi-Fi network interface 204. Management facility 114 may then determine, in accordance with mapping 300 (e.g., sub-row 316-2) of heuristic 116 and based on the detected "standard" operational mode selection command and the determined connection statuses of Bluetooth network interface 202 and Wi-Fi network interface 204, a state configuration for Bluetooth network interface 202, Wi-Fi network interface 204, and cellular data network interface 206 that includes an operation state of "off" for Bluetooth network interface 202, an operation state of "on" for Wi-Fi network interface 204, and an operation state of "sleep" for cellular data network interface 206. Management facility 114 may then direct Bluetooth network interface 202, Wi-Fi network interface 204, and cellular data network interface 206 to operate in accordance with the operation states of the determined state configuration in any of the ways described herein.

Location 412-3 represents a geographic location outside of Bluetooth service area 404, within Wi-Fi service area 408, and within cellular service area 410. While at location 412-3, device 402 may be connected to a Wi-Fi network medium provided by a suitable network provider within Wi-Fi service area 408. While device 402 is located at location 412-3 and connected to a Wi-Fi network medium provided within Wi-Fi service area 408, management facility 114 may detect a "standard" operational mode selection command from application 112 and determine a connection status of "connected" for Wi-Fi network interface 204. Management facility 114 may then determine, in accordance with mapping 300 (e.g., sub-row 316-3) of heuristic 116 and based on the detected "standard" operational mode selection command and the determined connection status of "connected" for Wi-Fi network interface 204, a state configuration for Bluetooth network interface 202, Wi-Fi network interface 204, and cellular data network interface 206 that includes operation states of "off" for Bluetooth network interface 202, "on" for Wi-Fi network interface 204, and "sleep" for cellular data network interface 206. Management facility 114 may then direct Bluetooth network interface 202, Wi-Fi network interface 204, and cellular data network interface 206 to operate in accordance with the operation states of the determined state configuration in any of the ways described herein.

Location 412-4 represents a geographic location outside of Bluetooth service area 404 and Wi-Fi service area 408, but within cellular service area 410. While device 402 is located at location 412-4, management facility 114 may detect a "standard" operational mode selection command from application 112 and determine a connection status of "network not available" for Bluetooth network interface 202, a connection status of "network not available" for Wi-Fi network interface 204, and a connection status of "network available" for cellular data network interface 206. Management facility 114 may determine, in accordance with mapping 300 (e.g., sub-row 316-4) of heuristic 116 and based on the detected "standard" operational mode selection command and the determined connection statuses of Bluetooth network interface 202, Wi-Fi network interface 204, and cellular data network interface 206, a state configuration for Bluetooth network interface 202, Wi-Fi network interface 204, and cellular data network interface 206 that includes operation states of "off" for Bluetooth network interface 202, "off" for Wi-Fi network interface 204, and "standby" for cellular data network interface 206. Management facility 114 may then direct Bluetooth network interface 202, Wi-Fi network interface 204, and cellular data network interface 206 to operate in accordance with the operation states of the determined state configuration in any of the ways described herein.

Location 412-5 represents a geographic location outside of Bluetooth service area 404, Wi-Fi service area 408, and cellular service area 410. While device 402 is at location 412-5, management facility 114 may detect a "standard" operational mode selection command from application 112, and determine connection statuses of "network not available" for all of Bluetooth network interface 202, Wi-Fi network interface 204, and cellular data network interface 206. Management facility 114 may determine, in accordance with mapping 300 (e.g., sub-row 316-5) of heuristic 116 and based on the detected "standard" operational mode selection command and the determined connection statuses of Bluetooth network interface 202, Wi-Fi network interface 204, and cellular data network interface 206, a state configuration for Bluetooth network interface 202, Wi-Fi network interface 204, and cellular data network interface 206 that includes operation states of "off" for Bluetooth network interface 202, "off" for Wi-Fi network interface 204, and "off" for cellular data network interface 206. Management facility 114 may then direct Bluetooth network interface 202, Wi-Fi network interface 204, and cellular data network interface 206 to operate in accordance with the operation states of the determined state configuration in any of the ways described herein.

In additional or alternative embodiments, an embedded computing device may include or be communicatively coupled to a sensor configured to measure a physical quantity. A physical quantity may include any physical property of a phenomenon, body, or substance that can be quantified by measurement. For example, a sensor may include a thermometer that measures a physical quantity of temperature (e.g., degrees Fahrenheit), a barometer that measures a physical quantity of atmospheric pressure, a global positioning system device that measures a physical location, an accelerometer that measures a physical quantity related to motion, a heart rate monitor that measures a physical quantity representative of a heart rate, an altimeter that measures a physical quantity of altitude, an ambient light sensor that measures a physical quantity of light (e.g., luminous intensity, luminous flux, etc.), and/or any other sensor as may suit a particular implementation.

Figure 5:
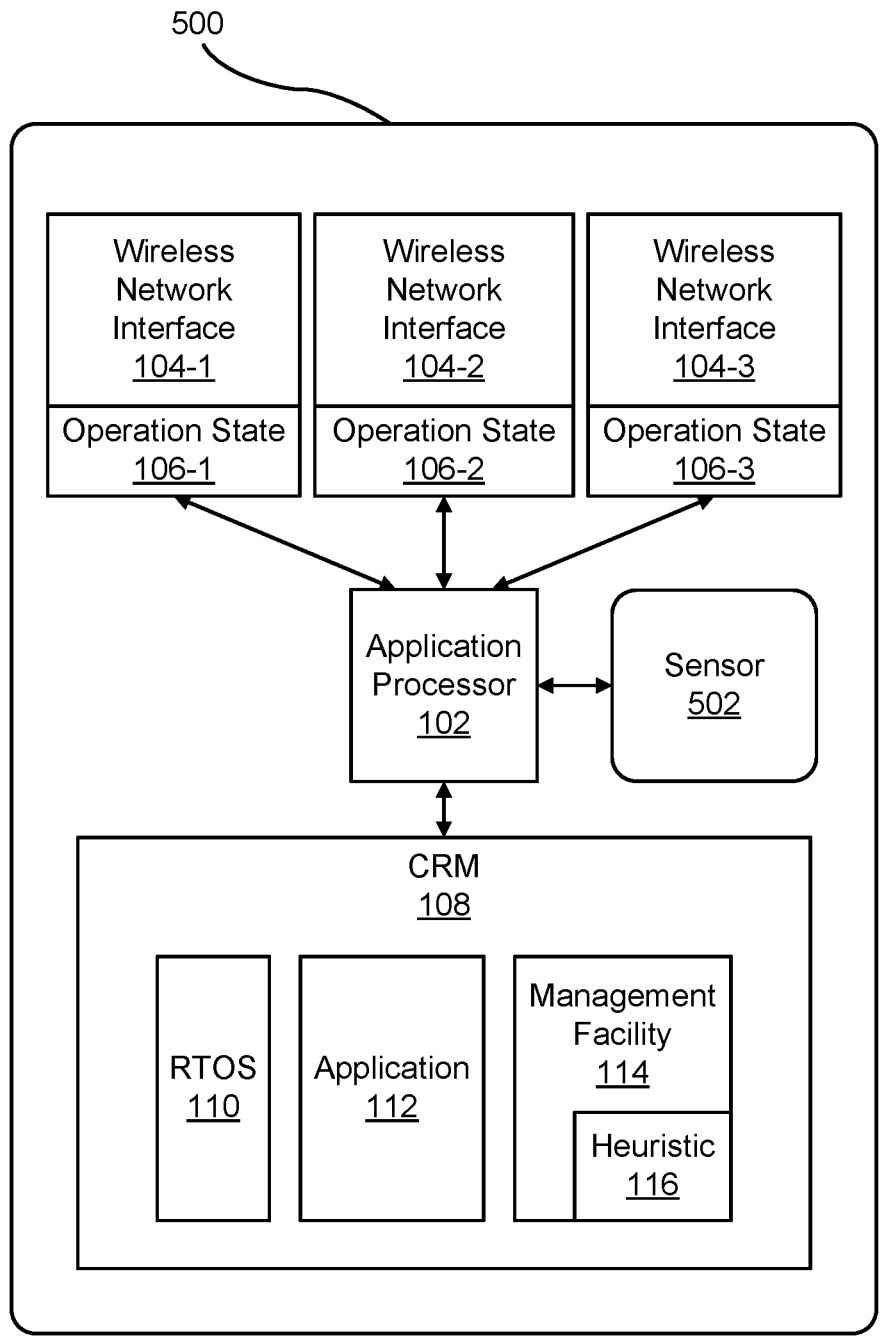
FIG. 5 illustrates an exemplary multi-radio embedded computing device according to principles described herein.

FIG. 5 illustrates an exemplary multi-radio embedded computing device 500 ("device 500") according to principles described herein. Device 500 is as device 100 with the addition of sensor 502. As shown, sensor 502 is communicatively coupled to application processor 102. Although shown as integrated within device 500 in FIG. 5, in alternative embodiments sensor 502 may be physically separate from and communicatively coupled to device 500. Application processor 102 may communicate with sensor 502 in any way suitable to support the operations described herein.

Sensor 502 may be any suitable sensor or plurality of sensors configured to sense at least one measurable physical quantity. For example, sensor 502 may be a global positioning system ("GPS") receiver, an accelerometer, a heart rate monitor, an altimeter, an ambient light sensor, a sensor of electrical current and/or voltage, and/or any other suitable sensor or combination of sensors. In an exemplary implementation, sensor 502 may be a GPS receiver.

Management facility 114 may direct application processor 102 to determine a physical quantity measured by sensor 502. This may be done in any suitable way, such as by management facility 114 directing application processor 102 to access sensor data from sensor 502 in real time and/or to access sensor data that has been stored in CRM 108.

Management facility 114 may direct application processor 102 to determine the state configuration for the plurality of wireless network interfaces 104 based at least in part on the physical quantity measured by sensor 502. To this end, heuristic 116 may include criteria that may direct management facility 114 to determine the state configuration for the plurality of wireless network devices 104 based at least in part on the physical quantity measured by sensor 502.

For example, management facility 114 may access a signal from sensor 502 that indicates that device 500 is traveling at a speed of twenty-five meters per second. Based on this measured speed of device 500, heuristic 116 may direct management facility 114 to determine a state configuration for wireless network interfaces 104 that prioritizes establishing and/or maintaining data communications by way of a wide area network interface (e.g., a cellular data network interface) over a local area network interface (e.g., a Wi-Fi network interface) and/or a personal area network interface (e.g., a Bluetooth network interface).

In other examples, a signal accessed by management facility 114 from sensor 502 may indicate that device 500 is stationary. Based on this signal, heuristic 116 may direct management facility 114 to determine a state configuration for wireless network interfaces 104 that prioritizes establishing and/or maintaining data communications by way of a personal area network interface over a local area network interface, and/or that prioritizes establishing and/or maintaining data communications by way of a local area network interface over a wide area network interface.

In certain implementations, sensor 502 may include a plurality of sensors, such as an accelerometer and a heart rate monitor. In such an implementation, heuristic 116 may include criteria that direct management facility 114 to determine a state configuration for wireless network interfaces 104 based on one or more signals received from sensor 502, each signal representative of at least one physical quantity.

For example, management facility 114 may access a first signal from sensor 502 that indicates that device 500 is in motion, and a second signal from sensor 502 that indicates that a user of device 500 has a heart rate of one hundred twenty beats per minute. These signals may indicate that the user of device 500 is currently walking. Based on these signals, heuristic 116 may direct management facility 114 to determine a state configuration for wireless network interfaces 104 that prioritizes establishing and/or maintaining data communications by way of a local area network interface over a personal area network interface, and/or that prioritizes establishing and/or maintaining data communications by way of a wide area network interface over a local area network interface.

The above-described examples of sensor configurations and criteria are exemplary. Device 500 may include any sensor and/or combination of sensors, and heuristic 116 may include any criteria configured to direct management facility 114 to use sensor data to determine a state configuration for wireless network interfaces 104, as may suit a particular implementation.

Figure 6:
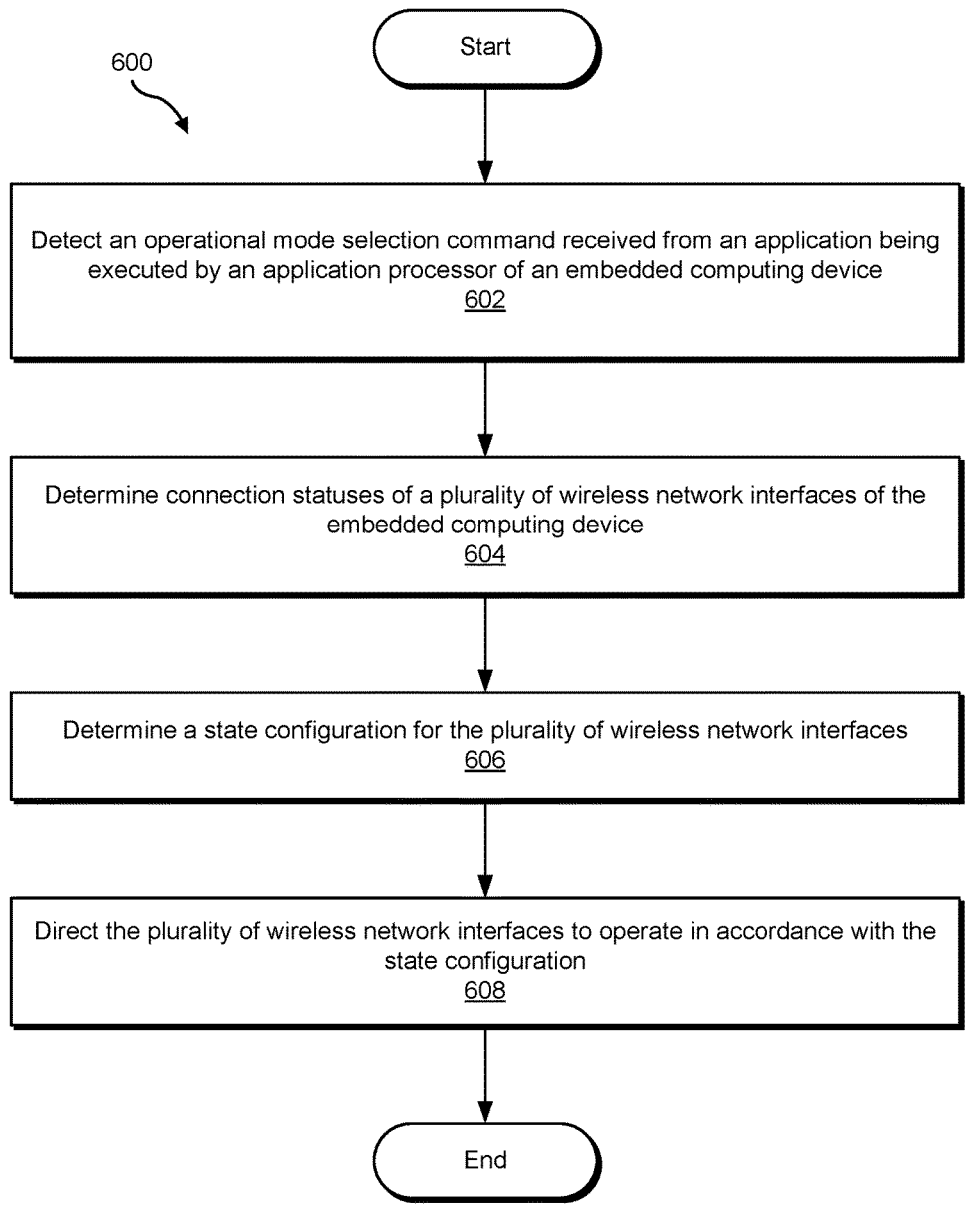
FIG. 6 illustrates an exemplary method of wireless network interface management on a multi-radio embedded computing device according to principles described herein.

FIG. 6 illustrates an exemplary method 600 for wireless network interface management on a multi-radio embedded computing device. While FIG. 6 illustrates exemplary operations according to one embodiment, other embodiments may omit, add to, reorder, and/or modify any of the operations shown in FIG. 6. One or more of the operations shown in FIG. 6 may be performed by a wireless network interface management system, which may include or be implemented in an embedded device (e.g., device 100, device 500, or an implementation thereof). In certain examples, the wireless network interface management system may be implemented as management facility 114 in an embedded computing device, such as described herein.

In operation 602, a wireless network interface management system (e.g., a wireless network interface management system implemented as management facility 114) detects an operational mode selection command received from an application being executed by an application processor of an embedded computing device. The operational mode selection command may select, from a plurality of operational modes, an operational mode of the application. Operation 602 may be performed in any of the ways described herein.

In operation 604, the wireless network interface management system determines connection statuses of a plurality of wireless network interfaces of the embedded computing device. Operation 604 may be performed in any of the ways described herein.

In operation 606, the wireless network interface management system determines a state configuration for the plurality of wireless network interfaces. Operation 606 may be performed in any of the ways described herein, such as by determining the state configuration in accordance with a wireless network configuration optimization heuristic and based on the detected operational mode selection command and the determined connection statuses of the plurality of wireless network interfaces of the embedded computing device. The state configuration may specify a set of network interface operation states for the plurality of wireless network interfaces of the embedded computing device.

In operation 608, the wireless network interface management system directs the plurality of wireless network interfaces to operate in accordance with the state configuration. Operation 608 may be performed in any of the ways described herein, such as by directing each wireless network interface within the plurality of wireless network interfaces to operate in accordance with a respective network interface operation state included in the set of network interface operation states.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An embedded computing device comprising:
a plurality of wireless network interfaces;
an application processor communicatively coupled to the plurality of wireless network interfaces, the application processor configured to execute instructions of a real-time operating system; and
a non-transitory computer-readable medium communicatively coupled to the application processor and that stores instructions that, when executed, direct the application processor to:
detect an operational mode selection command received from an application being executed by the application processor, the operational mode selection command selecting, from a plurality of operational modes, an operational mode of the application,
determine connection statuses of the plurality of wireless network interfaces,
determine, in accordance with a wireless network configuration optimization heuristic, and based on the detected operational mode selection command and the determined connection statuses of the plurality of wireless network interfaces of the embedded computing device, a state configuration for the plurality of wireless network interfaces, the state configuration specifying a set of network interface operation states for the plurality of wireless network interfaces, and
direct the plurality of wireless network interfaces to operate in accordance with the state configuration by directing each wireless network interface within the plurality of wireless network interfaces to operate in accordance with a respective network interface operation state included in the set of network interface operation states;
wherein the wireless network configuration optimization heuristic comprises a predefined mapping of the plurality of operational modes to a plurality of state configurations for the plurality of wireless network interfaces, the plurality of state configurations for the plurality of wireless network interface including the determined state configuration.

2. The embedded computing device of claim 1, wherein the predefined mapping further maps connection statuses for the plurality of wireless network interfaces to the plurality of operational modes and to the plurality of state configurations for the plurality of wireless network interfaces.

3. The embedded computing device of claim 1, wherein the plurality of wireless network interfaces comprises a cellular wide area network interface and at least one of a wireless local area network interface and a wireless personal area network interface.

4. The embedded computing device of claim 1, further comprising a sensor communicatively coupled to the application processor and that measures a physical quantity in real time;
wherein the instructions, when executed, direct the application processor to:
determine the physical quantity measured by the sensor, and
further base the determination of the state configuration for the plurality of wireless network interfaces on the physical quantity measured by the sensor.

5. The embedded computing device of claim 4, wherein the sensor comprises at least one of:
a global positioning system device;
an accelerometer;
a heart rate monitor;
an altimeter; and
an ambient light sensor.

6. The embedded computing device of claim 4, wherein the sensor comprises at least one of:
a thermometer;
a barometer;
an accelerometer;
a heart rate monitor;
an altimeter; and
an ambient light sensor.

7. The embedded computing device of claim 1, wherein the operational mode selection command is received by the application processor directly from the application being executed by the application processor.

8. An embedded computing device comprising:
a plurality of wireless network interfaces;
an application processor communicatively coupled to the plurality of wireless network interfaces, the application processor configured to execute instructions of a real-time operating system; and
a non-transitory computer-readable medium communicatively coupled to the application processor and that stores instructions that, when executed, direct the application processor to:
detect an operational mode selection command received from an application being executed by the application processor, the operational mode selection command selecting, from a plurality of operational modes, an operational mode of the application, determine connection statuses of the plurality of wireless network interfaces, determine, in accordance with a wireless network configuration optimization heuristic, and based on the detected operational mode selection command and the determined connection statuses of the plurality of wireless network interfaces of the embedded computing device, a state configuration for the plurality of wireless network interfaces, the state configuration specifying a set of network interface operation states for the plurality of wireless network interfaces, and direct the plurality of wireless network interfaces to operate in accordance with the state configuration by directing each wireless network interface within the plurality of wireless network interfaces to operate in accordance with a respective network interface operation state included in the set of network interface operation states;

wherein the plurality of operational modes comprises:

a standard operational mode selectable by the application to indicate that the application is ready to send or receive data;

a data operational mode selectable by the application to indicate that the application is sending or receiving data;

a cell only operational mode selectable by the application to indicate that data is to be sent or received only by way of a cellular wide area network interface; and a deep sleep operational mode selectable by the application to indicate that the application prioritizes device power consumption reduction over timely data reception.

9. A non-transitory computer-readable medium storing instructions that, when executed, direct an application processor of an embedded computing device configured to execute instructions of a real-time operating system to:

detect an operational mode selection command received from an application being executed by the application processor, the operational mode selection command selecting, from a plurality of operational modes, an operational mode of the application, determine connection statuses of a plurality of wireless network interfaces included in the embedded device, determine, in accordance with a wireless network configuration optimization heuristic, and based on the detected operational mode selection command and the determined connection statuses of the plurality of wireless network interfaces, a state configuration for the plurality of wireless network interfaces, the state configuration specifying a set of network interface operation states for the plurality of wireless network interfaces, and direct the plurality of wireless network interfaces to operate in accordance with the state configuration by directing each wireless network interface within the plurality of wireless network interfaces to operate in accordance with a respective network interface operation state included in the set of network interface operation states;

wherein the wireless network configuration optimization heuristic comprises a predefined mapping of the plurality of operational modes to a plurality of state configurations for the plurality of wireless network interfaces, the plurality of state configurations for the plurality of wireless network interface including the determined state configuration.

10. The non-transitory computer-readable medium of claim 9, wherein the predefined mapping further maps connection statuses for the plurality of wireless network interfaces to the plurality of operational modes and to the plurality of state configurations for the plurality of wireless network interfaces.

11. The non-transitory computer-readable medium of claim 9, wherein the plurality of wireless network interfaces comprises a cellular wide area network interface and at least one of a wireless local area network interface and a wireless personal area network interface.

12. The non-transitory computer-readable medium of claim 9 and that further stores instructions that, when executed, direct the application processor of the embedded computing device to:

determine a physical quantity measured by a sensor included in the embedded computing device; and further base the determination of the state configuration for the plurality of wireless network interfaces on the physical quantity measured by the sensor.

13. The non-transitory computer-readable medium of claim 12, wherein the sensor comprises at least one of:

a global positioning system device;

an accelerometer;

a heart rate monitor;

an altimeter; and an ambient light sensor.

14. A non-transitory computer-readable medium storing instructions that, when executed, direct an application processor of an embedded computing device configured to execute instructions of a real-time operating system to:

detect an operational mode selection command received from an application being executed by the application processor, the operational mode selection command selecting, from a plurality of operational modes, an operational mode of the application, determine connection statuses of a plurality of wireless network interfaces included in the embedded device, determine, in accordance with a wireless network configuration optimization heuristic, and based on the detected operational mode selection command and the determined connection statuses of the plurality of wireless network interfaces, a state configuration for the plurality of wireless network interfaces, the state configuration specifying a set of network interface operation states for the plurality of wireless network interfaces, and direct the plurality of wireless network interfaces to operate in accordance with the state configuration by directing each wireless network interface within the plurality of wireless network interfaces to operate in accordance with a respective network interface operation state included in the set of network interface operation states;

wherein the plurality of operational modes comprises:

a standard operational mode selectable by the application to indicate that the application is ready to send or receive data;

a data operational mode selectable by the application to indicate that the application is sending or receiving data;

a cell only operational mode selectable by the application to indicate that data is to be sent or received only by way of a cellular wide area network interface; and a deep sleep operational mode selectable by the application to indicate that the application prioritizes device power consumption reduction over timely data reception.

15. A method comprising:

detecting, by a wireless network interface management system implemented in an embedded computing device that includes an application processor executing a real-time operating system, an operational mode selection command received from an application being executed by the application processor of the embedded computing device, the operational mode selection command selecting, from a plurality of operational modes, an operational mode of the application;

determining, by the wireless network interface management system, connection statuses of a plurality of wireless network interfaces of the embedded computing device;

determining, by the wireless network interface management system, in accordance with a wireless network configuration optimization heuristic, and based on the detected operational mode selection command and the determined connection statuses of the plurality of wireless network interfaces, a state configuration for the plurality of wireless network interfaces, the state configuration specifying a set of network interface operation states for the plurality of wireless network interfaces; and directing, by the wireless network interface management system, the plurality of wireless network interfaces to operate in accordance with the state configuration by directing each wireless network interface within the plurality of wireless network interfaces to operate in accordance with a respective network interface operation state included in the set of network interface operation states;

wherein the wireless network configuration optimization heuristic comprises a predefined mapping of the plurality of operational modes to a plurality of state configurations for the plurality of wireless network interfaces, the plurality of state configurations for the plurality of wireless network interface including the determined state configuration.

16. The method of claim 15, wherein the predefined mapping further maps connection statuses for the plurality of wireless network interfaces to the plurality of operational modes and to the plurality of state configurations for the plurality of wireless network interfaces.

17. The method of claim 15, wherein the plurality of wireless network interfaces comprises a cellular wide area network interface and at least one of a wireless local area network interface and a wireless personal area network interface.

18. The method of claim 15, further comprising:

determining, by the wireless network interface management system, a physical quantity measured by a sensor included in the embedded computing device; and further basing, by the wireless network interface management system, the determination of the state configuration for the plurality of wireless network interfaces on the physical quantity measured by the sensor.

19. The method of claim 15, wherein the operational mode selection command is received by the application processor directly from the application being executed by the application processor.

20. A method comprising:

detecting, by a wireless network interface management system implemented in an embedded computing device that includes an application processor executing a real-time operating system, an operational mode selection command received from an application being executed by the application processor of the embedded computing device, the operational mode selection command selecting, from a plurality of operational modes, an operational mode of the application;

determining, by the wireless network interface management system, connection statuses of a plurality of wireless network interfaces of the embedded computing device;

determining, by the wireless network interface management system, in accordance with a wireless network configuration optimization heuristic, and based on the detected operational mode selection command and the determined connection statuses of the plurality of wireless network interfaces, a state configuration for the plurality of wireless network interfaces, the state configuration specifying a set of network interface operation states for the plurality of wireless network interfaces; and directing, by the wireless network interface management system, the plurality of wireless network interfaces to operate in accordance with the state configuration by directing each wireless network interface within the plurality of wireless network interfaces to operate in accordance with a respective network interface operation state included in the set of network interface operation states;

wherein the plurality of operational modes comprises:

a standard operational mode selectable by the application to indicate that the application is ready to send or receive data;

a data operational mode selectable by the application to indicate that the application is sending or receiving data;

a cell only operational mode selectable by the application to indicate that data is to be sent or received only by way of a cellular wide area network interface; and a deep sleep operational mode selectable by the application to indicate that the application prioritizes device power consumption reduction over timely data reception.

* * * * *